Oct. 11, 1955   J. P. CALCATERRA   2,720,241
BEAD FORMING MACHINE FOR BARREL DRUMS
Filed Oct. 10, 1952   4 Sheets-Sheet 1

INVENTOR
J. P. Calcaterra
BY
Webster & Webster
ATTY'S.

Oct. 11, 1955   J. P. CALCATERRA   2,720,241
BEAD FORMING MACHINE FOR BARREL DRUMS
Filed Oct. 10, 1952   4 Sheets-Sheet 3

INVENTOR
J. P. Calcaterra
BY
Webster & Webster
ATTY'S.

Oct. 11, 1955    J. P. CALCATERRA    2,720,241
BEAD FORMING MACHINE FOR BARREL DRUMS
Filed Oct. 10, 1952    4 Sheets-Sheet 4

INVENTOR
J. P. Calcaterra
BY
Webster & Webster
ATTY'S.

United States Patent Office 2,720,241
Patented Oct. 11, 1955

2,720,241

BEAD FORMING MACHINE FOR BARREL DRUMS

Joseph P. Calcaterra, Stockton, Calif., assignor to Carando Machine Works, Stockton, Calif., a partnership Application October 10, 1952, Serial No. 314,190

1 Claim. (Cl. 153—73)

This invention relates in general to a machine used in connection with one of the progressive steps in the manufacture of sheet metal barrels.

In particular the invention is directed to, and it is a major object to provide, a novel machine for simultaneously forming, by the use of expansion die heads, the intermediate, outwardly deformed, circumferential beads on the sheet metal drum of a barrel prior to attachment of the end heads thereof.

Another important object of the present invention is to provide a machine, for the purpose described, which includes novel mounting and actuating mechanism for the pair of opposed, longitudinally reciprocable, radially expansible die heads which the machine includes; such die heads, when advanced, being disposed within the drum, and then when expanded deforming the beads outwardly on said drum.

An additional object of the instant invention is to provide a bead forming machine, as in the preceding paragraph, wherein said mounting or actuating mechanism includes—for each expansible die head—a novel crank and cam assembly operative to reciprocate and actuate the related die head through a predetermined working cycle; the cycles for both die heads being alike and in unison, though opposed.

A further object of the invention is to provide a bead forming machine which includes a fluid pressure power cylinder, in novel arrangement with the remainder of the mechanism, operative in combination with the slides which support the expansible die heads to assure of retraction of the latter during the last portion of each cycle.

It is also an object of the invention to provide a machine which is effective to positively, accurately, and rapidly form the intermediate beads on the sheet metal drum of a barrel.

Still another object of the invention is to provide a practical and reliable bead forming machine.

These objects are accomplished by means of such structure and relative arrangement of parts as will fully appear by a perusal of the following specification and claim.

Figure 4:
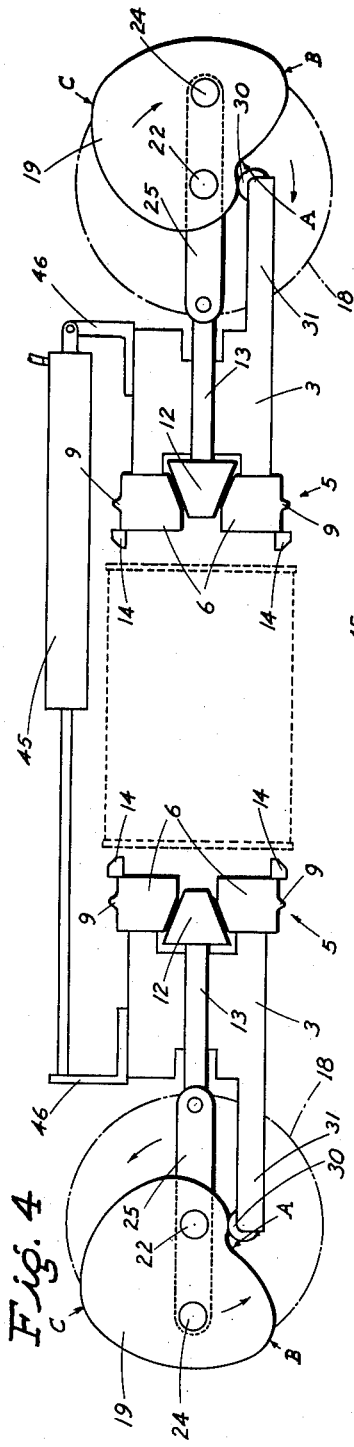
Figure 5:
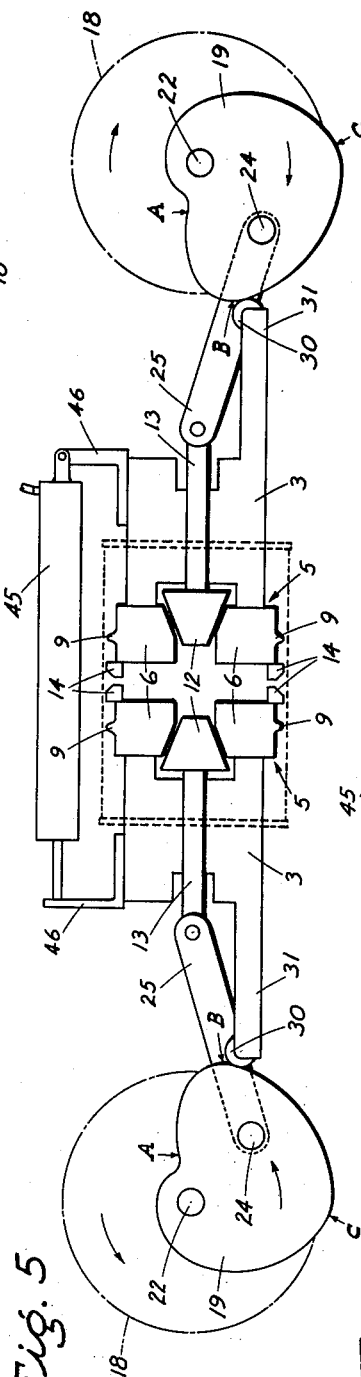
Figure 6:
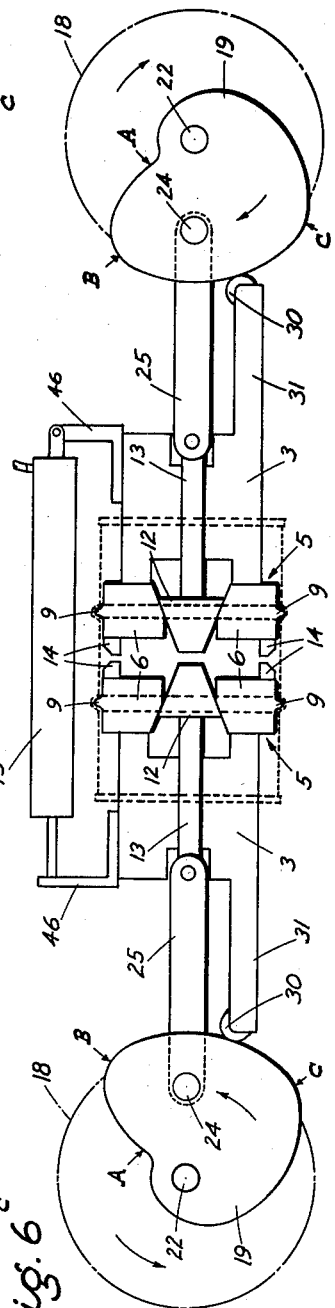

Figs. 4-6 inclusive are longitudinal, elevational diagrams showing successive steps of the cycle of operation; Fig. 4 showing the expansible die heads retracted; Fig. 5 showing the expansible die heads advanced into the drum but before expansion of said heads; and Fig. 6 showing the die heads as expanded to form the intermediate beads on the drum.

Referring now more particularly to the characters of reference on the drawings, the machine comprises a heavy-duty floor supported bed 1 formed, at opposite ends, with upstanding, transversely spaced, supports 2.

Between the pairs of supports 2 the bed 1 is fitted with opposed, heavy-duty slides 3, each of which includes an upstanding slide body 4.

The slide bodies 4, on their inner or adjacent ends, are each fitted with a circular, expansible die head, indicated generally at 5. As the die heads are each of identical construction, except that they are opposed, a description of one will suffice for both.

Figure 1:
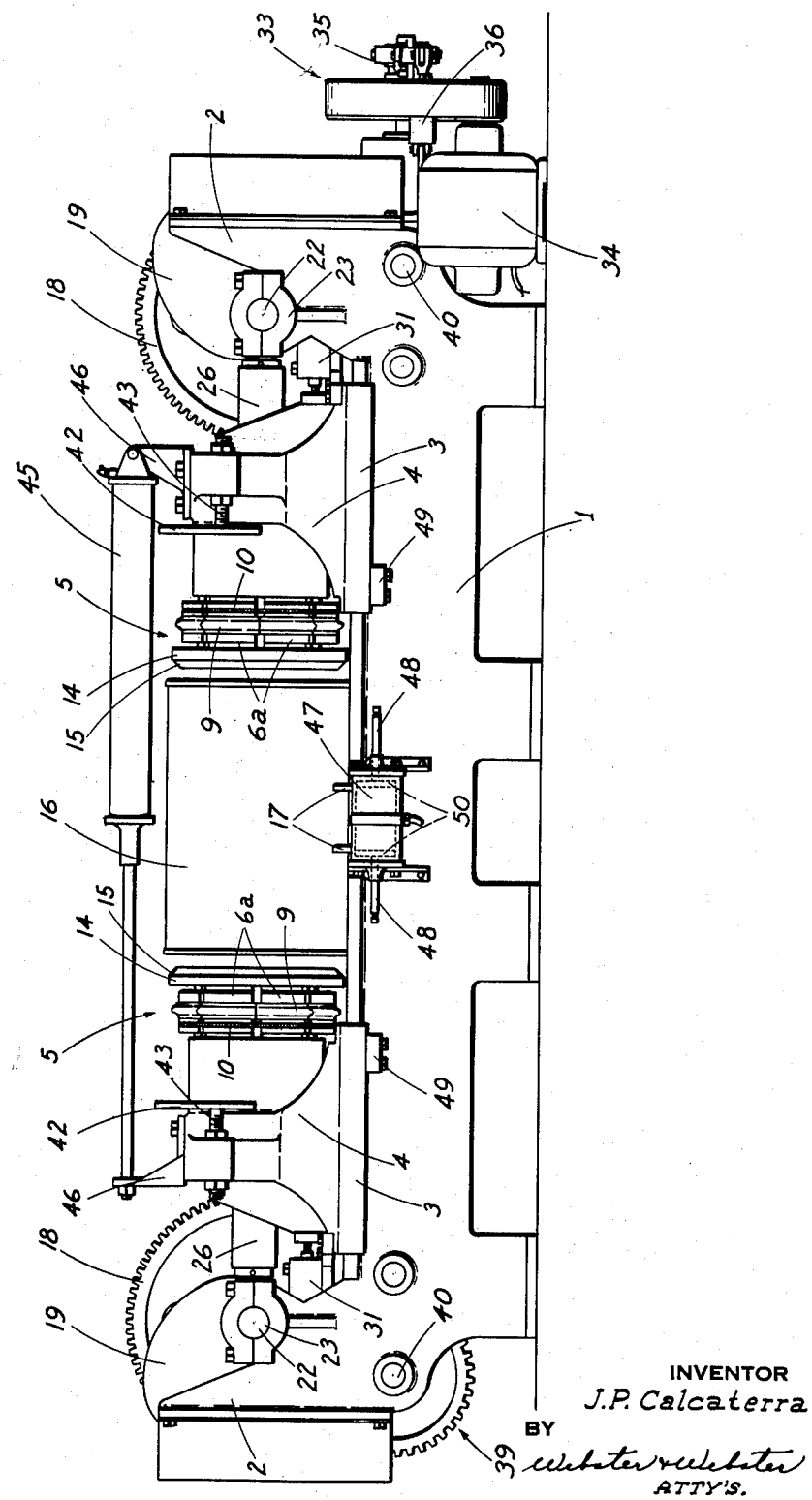
Fig. 1 is a side elevation of the machine showing the drum in place but with the expansible die heads retracted; i. e. in starting position.
Figure 2:
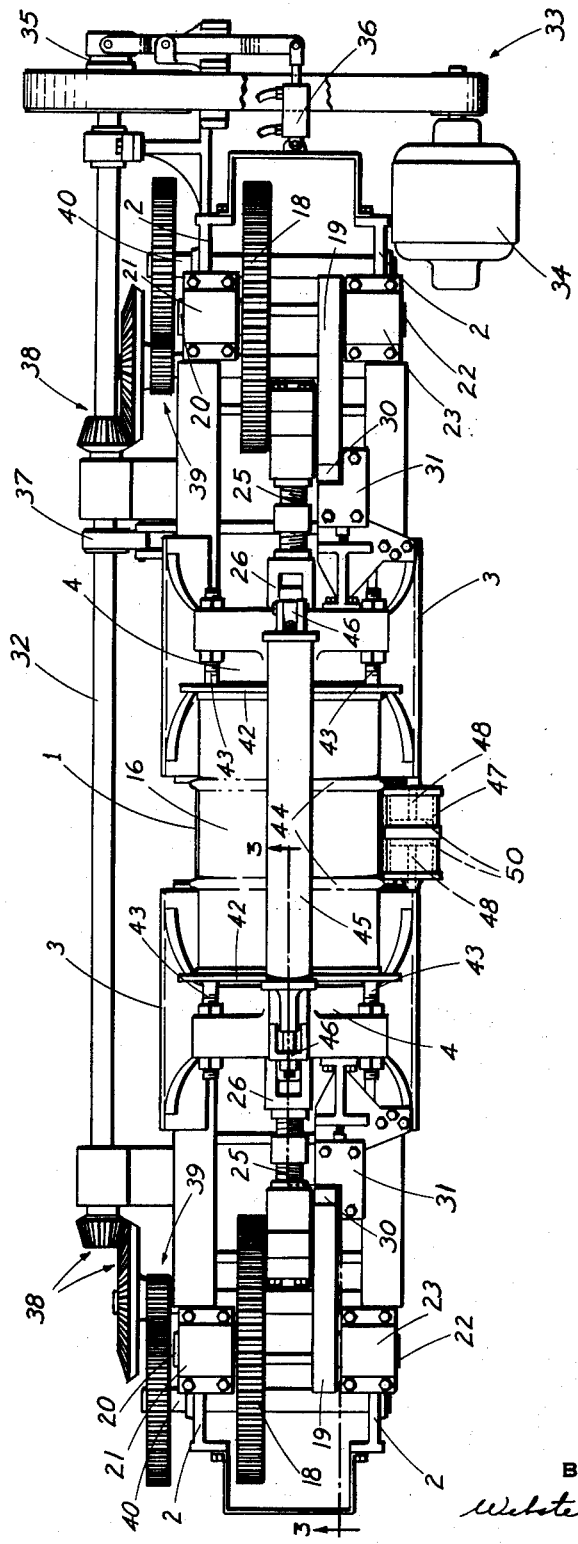
Fig. 2 is a plan view of the machine, with the expansible die heads advanced into the drum and actuated to form the intermediate beads on the latter.

Each expansible die head 5 comprises a multiplicity of radial slide blocks 6 carried between a circular outer end plate 7 and the adjacent end of the slide body 4; the plate 7 being supported by a circumferential row of bolts 8 which tie to said body. The radial slide blocks 6 work between adjacent bolts 8, and at their outer ends said slide blocks 6 carry shoe blocks 6a; the latter being fitted at their radially outermost ends with circumferentially extending dies or segmental shoes 9. The segmental shoes 9 are of a number and of sufficient length that together they form a substantially continuous die assembly which is normally retracted, as in Fig. 1. The radial slide blocks 6 are normally maintained retracted by a full-circle tension spring 10 which surrounds the shoe blocks 6a, and other full-circle tension springs 11 which surround the slide blocks 6.

Figure 3:
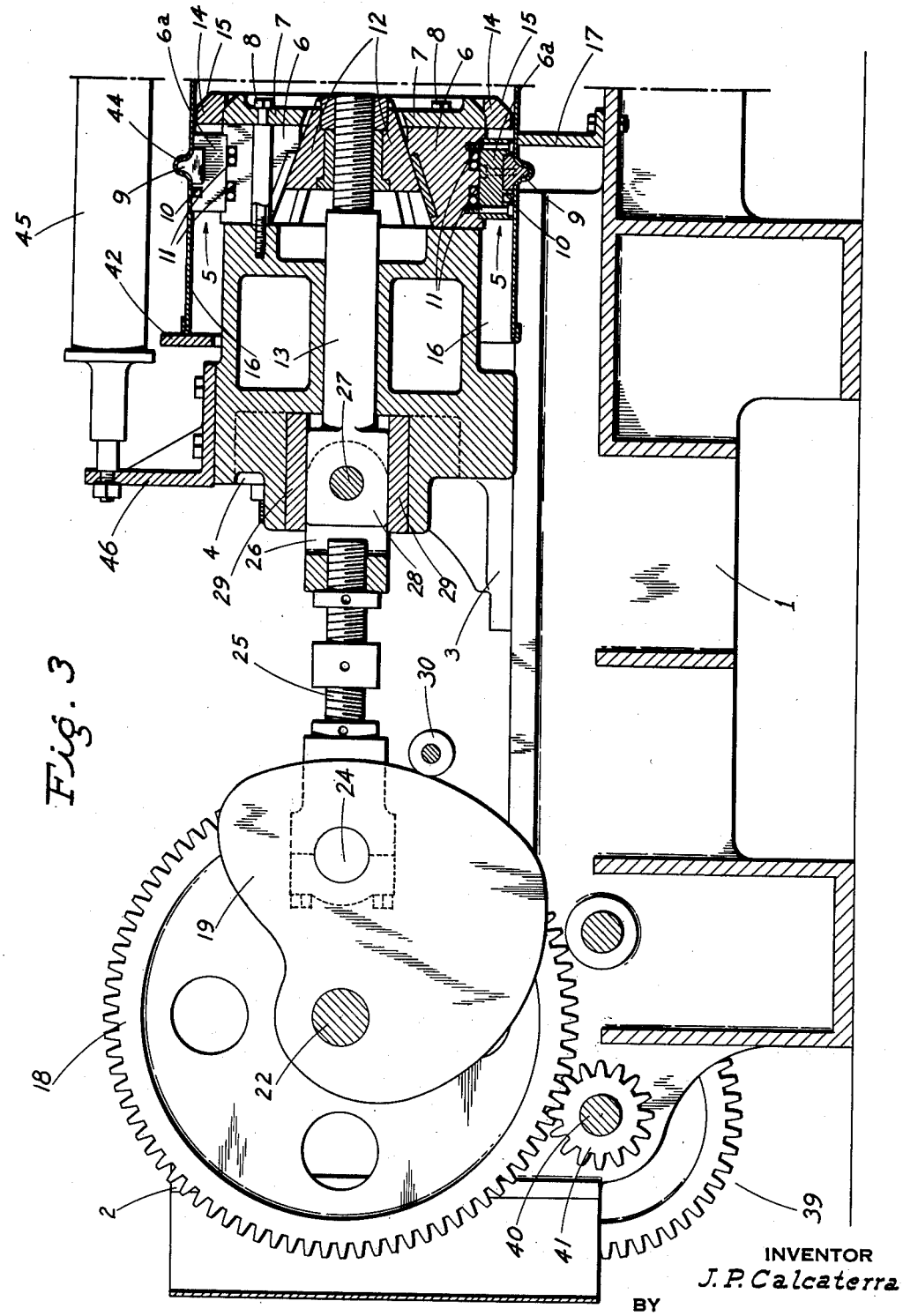
Fig. 3 is an enlarged fragmentary longitudinal sectional elevation on line 3—3 of Fig. 2.

At their inner ends the radial slide blocks 6 are diagonal and ride the face of a plunger cone 12, whose foremost end extends in the direction of the outer end of the related expansible die head 5. The plunger cone 12 is shown in its starting or fully retracted position in Fig. 4, and in its fully advanced position in Figs. 3 and 6.

The plunger cone 12 is carried on the adjacent end of a plunger rod 13 which extends axially and slidably in the related body 4, being actuated in the manner as will hereinafter appear.

At the outer end thereof each expansible die head 5 includes a locator ring 14 surrounding and fixed in connection with the plate 7; the outer corner of such ring being chamfered, as at 15.

When the expansible die heads 5 simultaneously advance into a sheet metal drum, or drum blank, 16 during each cycle of operation, the chamfers 15 lead the rings 14 easily into the drum from opposite ends and so that said drum is then properly located and supported by said rings 14.

Before the start of each cycle of operation of the machine, and at which time the expansible die heads 5 are contracted, a barrel is placed in the machine between such die heads, with the barrel supported on longitudinally spaced, transverse cradles 17 which upstand from the bed 1.

The slides 3 and expansible die heads 5 are actuated in a predetermined cycle by like mechanisms disposed at the ends of the machine; each such mechanism comprising the following:

A bull gear 18 and a generally heart-shaped rotary cam 19 are disposed in spaced-apart relation between the adjacent, upstanding, transversely spaced supports 2. The bull gear 18 is fitted with an outwardly projecting stub shaft 20, journaled—as at 21—in connection with the near support 2, while the rotary cam 9 is fitted with an outwardly projecting stub shaft 22 journaled, as at 23, in connection with the other support 2.

A crank pin 24 connects the bull gear 18 and the rotary cam 19 in eccentric relation to the axis of said gear. A connecting rod 25 is attached at one end to the crank pin 24 and thence extends longitudinally, being provided at the outer end with a clevis 26, pivoted—as at 27—to a block 28 on the adjacent end of the plunger rod 13. The block 28 runs top and bottom against wear plates 29 of limited width; i. e. of a width so that the clevis 26 can swing up or down with the wear plates moving between the sides of said clevis.

A cam follower in the form of a roller 30 runs on the face of the rotary cam 19, and such roller is carried by an extension 31 on the corresponding slide 3.

Each cycle of operation of the machine is accomplished with one full revolution of the bull gears 18; the latter being driven through such revolution by means of the following drive mechanism.

A longitudinal countershaft 32 extends along one side of the bed 1, and such shaft 32 is driven, at one end, by an endless belt and pulley unit 33 from an electric motor 34; there being a clutch 35 interposed between such endless belt and pulley unit and the adjacent end of the shaft 32. The clutch 35 is operated through the medium of a double-acting power cylinder 36. A power actuated brake 37 of suitable type works in connection with the shaft 32 to prevent overrunning thereof.

The shaft 32 imparts rotation, by means of pinion and bevel gear assemblies 38, to reduction gear trains 39 at each end of the machine; each reduction gear train 39 driving a cross shaft 40 having a pinion 41 thereon in mesh with the related bull gear 18.

By means of suitable timing mechanism the power cylinder 36 causes engagement of the clutch 35, whereupon the shaft 32 begins to rotate, driving the bull gears 18 in the directions indicated. After the bull gears 18 have made a full revolution, the power cylinder 36 disengages the clutch 35 and the brake 37 is brought into play to stop the shaft 32.

With each revolution of the bull gears 18 in the directions indicated, the following cycle of operation occurs, and which is best illustrated in Figs. 4–6 inclusive.

From a starting position, as in Fig. 4, the rotary cams 19, together with the crank pins 24, work the related mechanisms, including the slides 3, to cause the expansible die heads 5 to move in unison toward each other, or forwardly from retracted positions clear of the cradle-supported drum 16 to advanced positions within the drum, as in Fig. 5; the dies remaining contracted until they reach such position of advance in the drum.

Overhead stop plates 42 of segmental ring form, carried on the slides 3 by adjustment studs 43, abut opposite ends of the drum to properly locate it longitudinally upon the expansible die heads 5 being advanced into the drum, as aforesaid.

The expansible die heads 5, upon being advanced into the drum from opposite ends, dwell therein for a short period of time, and during which dwell such heads are simultaneously expanded to outwardly deform circumferential beads 44 on the drum 16; this being followed—still within the period of the dwell—by contraction of said heads. As soon as the expansible die heads 5 contract, and the dwell thereof ends, said die heads withdraw from the drum to starting or retracted position, whereupon clutch 35 is disengaged and brake 37 engaged, as previously described; the machine thus being stopped preparatory to the next cycle of operation. The drum 16 is then removed from the machine and the next one put in place.

The expansible die heads 5 are each carried through the above described cycle, by the related cam and crank pin assembly, in the following manner:

Each rotary cam 19—which turns with the adjacent bull gear 18 in the direction indicated by the arrows—is formed with a cam face which comprises a slide advancing section A—B of progressively increasing eccentricity relative to the cam axis; a slide dwell section B—C concentric to said axis; and a slide retraction section C—A of progressively decreasing eccentricity relative to said axis.

With initial rotation of each cam 19, the section A—B thereof works the related slide 3 through its forward stroke, advancing the corresponding expansible die head 5 from its retracted to its advanced position. At the same time the corresponding crank pin 24, which starts at a retracted dead-center position, as in Fig. 4, imparts a motion through the connecting rod 25 and plunger rod 13 to the cone 12, which exactly matches the travel from retracted to advanced position of the expansible die head 5.

When each expansible die head 5 reaches full advance, and at the beginning of effectiveness of the slide dwell section B—C of such cam, the crank pin 25 is still short of its advanced dead-center position (see Fig. 5). The result is that during the dwell of each slide 3 and related expansible die head 5 produced by the slide dwell section B—C of the cam, the crank pin 24 moves from a point below its advanced dead-center position, as in Fig. 5, to said position, as in Fig. 6, and thence to a point above such position.

Thus, while each slide 3 and expansible die head 5 dwells, the related crank pin 24 traverses an arc which causes first an advance and then a retraction of the corresponding connecting rod 25, plunger rod 13, and plunger cone 12. Upon such advance of the plunger cone 12 it forcefully urges the slide blocks 6, shoe blocks 6a, and segmental shoes 9 radially outwardly, whereby the latter deform a continuous circumferential bead 44 outwardly on the supported drum 16.

By the time that the point C of each rotary cam becomes effective, the crank pin 24 has retracted the connecting rod 25, plunger rod 13, and plunger cone 12, so that the corresponding die head 5 is ready for withdrawal from the drum.

Such withdrawal occurs during the remaining turn of the cam; i. e. the working of slide retraction section CA. During the working of this latter section of each cam 19 the related cam roller 30 is maintained in contact with the cam—for the return stroke of the corresponding slide—by means of a longitudinal power cylinder 45 connected between brackets 46 which upstand from the slides 3; the power cylinder 45 being placed under fluid pressure at the moment that the cams reach point C.

The power cylinder 45 therefore acts to assure of positive retraction of the slides 3 and expansible die heads 5 rearwardly to their starting positions as the slide retraction sections C—A of the cams are in play. As soon as the slides 3 are fully retracted, the power cylinder 45 is deenergized; this being accomplished by appropriate timing mechanism.

Thus, with the described cam and crank arrangement, the expansible die heads are carried positively and smoothly through the intended cycle of operation, with the expansible die heads being expanded simultaneously to form the desired circumferential beads on the drum intermediate its ends, with such beads accurately positioned with respect to the drum ends.

As the slides 3 advance with some speed they are cushioned at the point of full advance by a shock absorber cylinder 47 of double-ended type mounted on one side of the bed 1 and having oppositely projecting piston rods 48 which abut blocks 49 on the slides; the cylinder 47 including pistons 50 therein attached to the rods 48. The cylinder 47 has a constant fluid pressure maintained therein between the pistons 50. In addition to serving as a shock absorber for the slides 3 as the same reach the point of maximum advance, such cylinder also assures that, at such time, the rollers 30 are urged in the direction of the corresponding rotary cams 19.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a bead forming machine for sheet metal drum blanks, a bed, cradles on the bed on which to support a blank, slides mounted on the bed initially beyond the ends of a supported blank, bead-forming die units carried by the slides for engagement with the interior of the blank when the slides are advanced toward each other a predetermined distance, power means including cams to so advance the slides simultaneously, and separate power means to retract the slides comprising a single-acting hydraulic ram, and brackets on the slides between which the ram extends and to which the ram is connected at its opposite ends clear of the supported blank; the ram being contracted when the slides are advanced, and the cams forming stops to limit the retracting movement of the slides.

References Cited in the file of this patent

UNITED STATES PATENTS

| | | |
|---|---|---|
| 239,402 | Scott | Mar. 29, 1881 |
| 313,205 | Hawkins | Mar. 3, 1885 |
| 1,039,555 | Livermore | Sept. 24, 1912 |
| 1,952,857 | Grotnes | Mar. 27, 1934 |
| 2,004,816 | Lindgren | June 11, 1935 |
| 2,089,475 | Grotnes | Aug. 10, 1937 |
| 2,211,009 | Grotnes | Aug. 13, 1940 |